(12) United States Patent
Ligtenberg et al.

(10) Patent No.: US 7,055,215 B1
(45) Date of Patent: Jun. 6, 2006

(54) HINGE ASSEMBLY

(75) Inventors: Chris Ligtenberg, San Carlos, CA (US); Greg Springer, Sunnyvale, CA (US); Sung Kim, Palo Alto, CA (US); Kevin Fetterman, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/741,956

(22) Filed: Dec. 19, 2003

(51) Int. Cl.
*E05F 1/08* (2006.01)

(52) U.S. Cl. .......................... 16/307; 16/400; 16/289; 16/308; 16/342; 16/337; 248/454

(58) Field of Classification Search ................. 16/307, 16/400 X, 289 X, 290, 292, 306, 308, 232, 16/375, 374, 299, 377, 342, 337; 248/454, 248/469

See application file for complete search history.

(56) References Cited

U.S. PATENT DOCUMENTS

| | | | |
|---|---|---|---|
| 5,028,025 A | 7/1991 | Herron et al. | |
| 5,028,913 A | 7/1991 | Kitamura | |
| 5,382,108 A * | 1/1995 | Ojima | ........................ 403/120 |
| 5,467,504 A | 11/1995 | Yang | |
| 5,564,163 A * | 10/1996 | Lowry et al. | .................. 16/342 |
| 5,566,048 A | 10/1996 | Esterberg et al. | |
| 5,649,309 A * | 7/1997 | Wilcox et al. | ........... 455/575.3 |
| 5,771,539 A * | 6/1998 | Wahlstedt et al. | ............ 16/285 |
| 5,771,540 A * | 6/1998 | Carpenter et al. | ............ 16/308 |
| 5,787,549 A | 8/1998 | Soderlund | |
| 5,894,633 A * | 4/1999 | Kaneko | ........................ 16/306 |
| 5,923,751 A * | 7/1999 | Ohtsuka et al. | ........ 379/433.13 |
| 5,976,236 A * | 11/1999 | Yoshihara et al. | ....... 106/286.6 |
| 6,301,748 B1 * | 10/2001 | Su-Man | ........................ 16/342 |
| 6,481,057 B1 * | 11/2002 | Lin | .............................. 16/340 |
| 6,510,588 B1 * | 1/2003 | Eromaki | ....................... 16/308 |
| 6,513,197 B1 * | 2/2003 | Rude et al. | .................... 16/342 |
| 6,588,062 B1 * | 7/2003 | Novin et al. | .................... 16/342 |
| 6,714,408 B1 * | 3/2004 | Wang et al. | ................. 361/683 |
| 6,754,081 B1 * | 6/2004 | Rude et al. | ................. 361/725 |

FOREIGN PATENT DOCUMENTS

JP 2003151458 A * 5/2003

* cited by examiner

*Primary Examiner*—Brian E. Glessner
*Assistant Examiner*—Mark Williams
(74) *Attorney, Agent, or Firm*—Blakely, Sokoloff, Taylor & Zafman LLP (57) ABSTRACT

In one exemplary embodiment, a hinge assembly having a counterbalance spring, a friction mechanism, and an independent pop-up element attached to a shaft. In one embodiment, a hinge assembly having a counterbalancing spring and an independent pop-up element attaches a display assembly to a base assembly of a portable computer.

21 Claims, 11 Drawing Sheets

SECTION A-A   FIG. 7A

SECTION B-B  FIG. 7B

HINGE ASSEMBLY

TECHNICAL FIELD

The invention relates generally to hinge assemblies, and in one embodiment, for use in computing devices such as portable computers.

BACKGROUND

Advances in technology have enabled the size of personal computers to decrease. As a result, the use of portable computers, such as notebook computers, laptop computers, and notepad computers, is rapidly increasing. The portability of notebook computers and notepad computers enables a user to keep his or her computer readily accessible such that computing resources are effectively always at hand. For example, a notebook computer running on a battery pack enables a user to access computational resources without the need for external sources of electricity.

Figure 1:
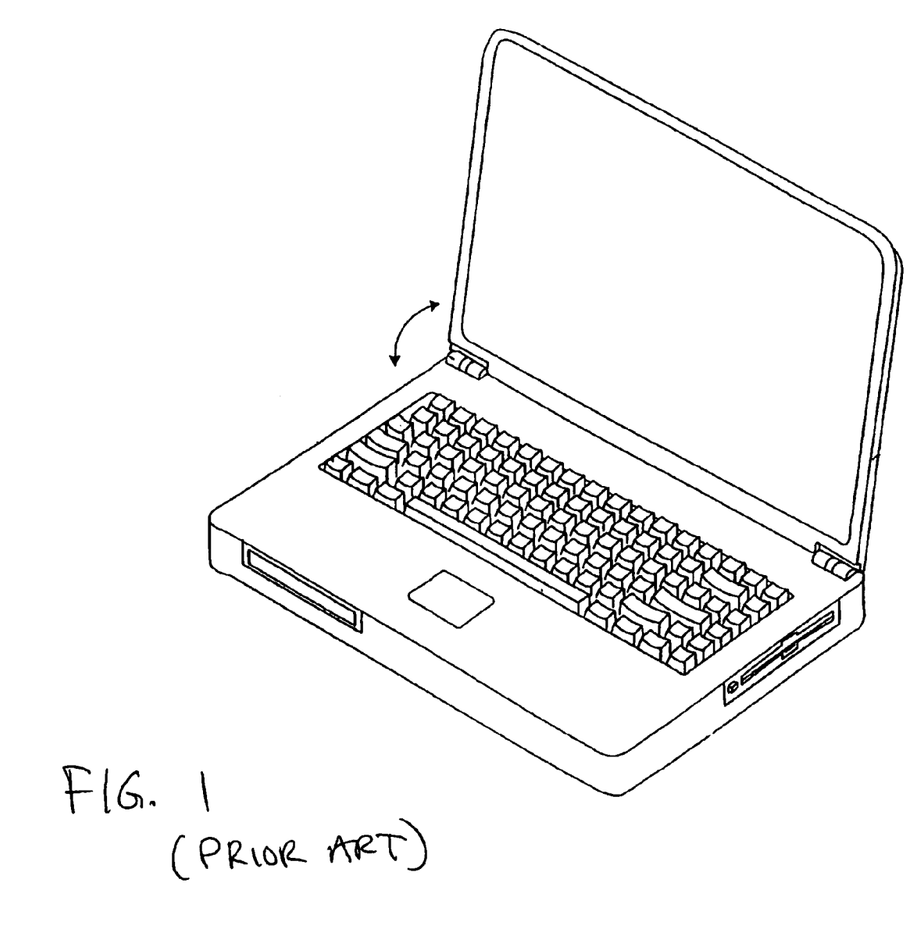
FIG. 1 illustrates a prior art portable computer.

Many portable computers are configured such that a display screen of the computer pivots, or rotates, with respect to the base of the computer. FIG. 1 is a diagrammatic representation of a portable computer or, more specifically, a notebook computer. A notebook computer generally includes a display assembly and a base assembly. The display assembly typically includes a display screen surrounded by a plastic housing, while the base assembly often includes an input/output device such as a keyboard, and houses a central processing unit and memory devices (not shown). The plastic housing of the display assembly is hinged to a base housing that includes conventional computer components such a keyboard, disk drives, and connector ports. The hinge assembly allows the display assembly to rotate or pivot relative to a base housing and remain in a desired static position. The display housing is movable about the hinge(s) between a closed position against the base housing and an open position with the display and keyboard exposed for use. Hinge assemblies typically have a portion that is secured to the display housing and another portion that is secured to the base housing. Portable computer hinges typically incorporate spring/friction mechanisms for rotating the display housing and for maintaining it in a static position. For large or bulky portable computers, the frictional force in the hinge mechanism that supports the weight of the display housing may be significant that two hands are required to open the computer—one hand to hold the base while the other hand pivots the display about the hinge. This becomes more evident as display assemblies become larger, thereby increasing the weight of the display assembly relative to the base housing. Furthermore, the weight of the display housing has a tendency to slam closed against the computer base, as the friction hinge weakens over time. Also, because the base and display housings are made of light-weight plastics, they cannot withstand the forces required to rotate the display housing. This results in the plastic cracking around the hinge assembly.

When a display assembly is closed over a base housing, a latch mechanism locks the two portions together. Some display assemblies include a display "pop-up" feature as part of a portable computer's overall hinge assembly. When the latch on the display housing is released, a certain amount of force stored in the hinge assembly causes the display assembly to rotate open slightly to provide enough room for a user to grasp the display housing and rotate it open relative to the base housing. The pop-up feature subjects the hinge assembly to relatively large biasing spring forces where plastic display housings are sufficiently compliant to absorb such forces. However, portable computers have display and base housings that are entirely or partially metal-based, with materials such as titanium or aluminum. Metal display housings may not be able to withstand such large biasing forces from a pop-up feature, causing the metal to bend and form permanent arcs.

SUMMARY

Embodiments of a hinge assembly having a counterbalance spring and an independent pop-up feature are described. In one embodiment of the present invention, a hinge assembly includes a counterbalance spring, a friction mechanism, and an independent pop-up element attached to a shaft. In an alternative embodiment, a hinge assembly having a counterbalancing spring and an independent pop-up element attaches a display assembly to a base assembly of a portable computer.

There are numerous other embodiments which are described herein, and these embodiments generally relate to hinge assemblies that allows a user to rotate a display assembly of a portable computer with little effort.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth such as examples of specific, components, circuits, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

The term "coupled" as used herein means connected directly to or indirectly connected through one or more intervening components, structures or elements. The terms "above," "below," and "between" as used herein refer to a relative position of one component or element with respect to other components or elements. As such, one component disposed above or below another component may be directly in contact with the other component or may have one or more intervening component. Moreover, one component disposed between other components may be directly in contact with the other components or may have one or more intervening components.

Various embodiments of a hinge assembly are described. In one embodiment of the present invention, a hinge assembly is adapted for use in a portable or laptop computer. The hinge assembly includes a counterbalance spring, a friction element, and a pop-up feature. The portable computer may include a display assembly and a base assembly coupled by the hinge assembly. The hinge assembly allows the display assembly to rotate relative to the base assembly from a closed to an open position up to 180 degrees. The counterbalance spring of the hinge assembly provides a feel of weightlessness of the display assembly to a user when rotated relative to the base assembly, and the friction element maintains the display assembly in a static position desired by a user. The pop-up feature creates an initial opening travel of the display assembly from the closed position. This feature aids the user in grasping the display assembly to rotate open. The combination of the pop-up feature and the counterbalance spring disposed in the hinge assembly makes it very easy and convenient for a user to open and rotate the display assembly to a desired position. The benefits provided by embodiments of the present invention are suitable for display assemblies of large size and significant weight. In alternative embodiments, the hinge assembly may be suitable for use with portable computers with base and display assemblies (e.g., display frame, base assembly housing) made entirely or partially of metallic materials, in particular, display and base housings made of metals such as steel, aluminum, titanium, or combinations thereof.

Figure 2:
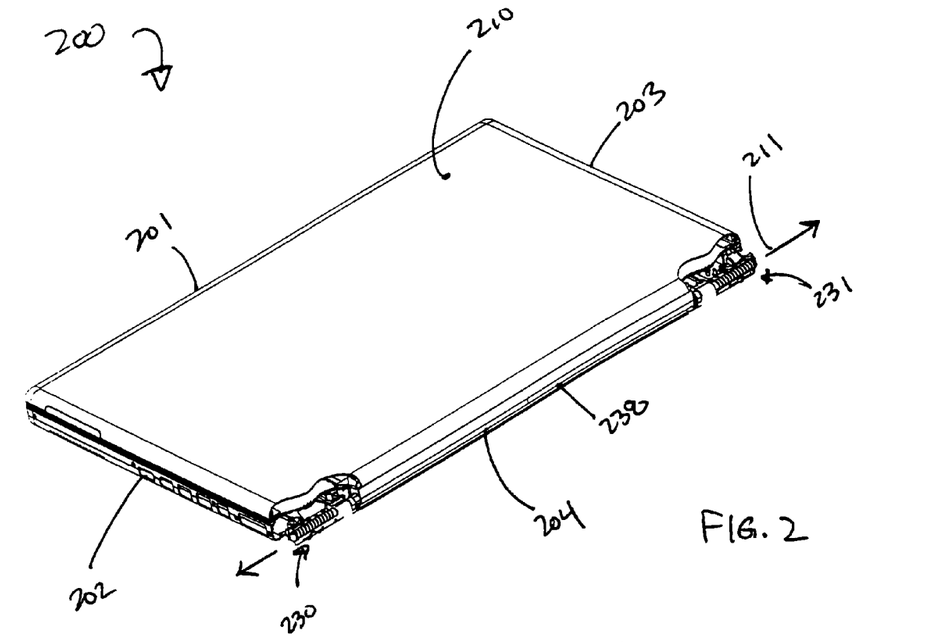
FIG. 2 illustrates one embodiment of a portable computer having a display assembly, a base assembly, and a hinge assembly.

By way of example only, embodiments of the hinge assembly described herein are described with respect to a portable computer. It may be appreciated, however, that embodiments of the hinge assembly described herein are not limited for use in portable computers but may be used with other types of computing devices such as PDAs, portable music players, or any type of computing device that includes a display that rotates relative to a base. FIG. 2 illustrates a perspective view of a portable computer 200 that includes a display assembly 210 and a base assembly 220. Portable computer 200 has a front side 201, a right side 202, a left side 203, and a back side 204 and is illustrated in a closed position with display assembly 210 rested flat against base assembly 220, to cover a keyboard and display screen (not shown). A latch mechanism integrated near a front side 201 of display assembly 210 may be utilized to maintain portable computer 200 in the closed position. Display assembly 210 is coupled to base assembly 220 with hinge assemblies 230, 231 (illustrated in a partial cut-out view) disposed near the ends of back side 204 and covered by hinge housing or cover 238. Display assembly 210 is rotatable relative to base assembly 220 about a pivot axis 211 that is concentric with a center line of an elongated pivot shaft 232 disposed within hinge assemblies 230, 231.

Figure 2A:
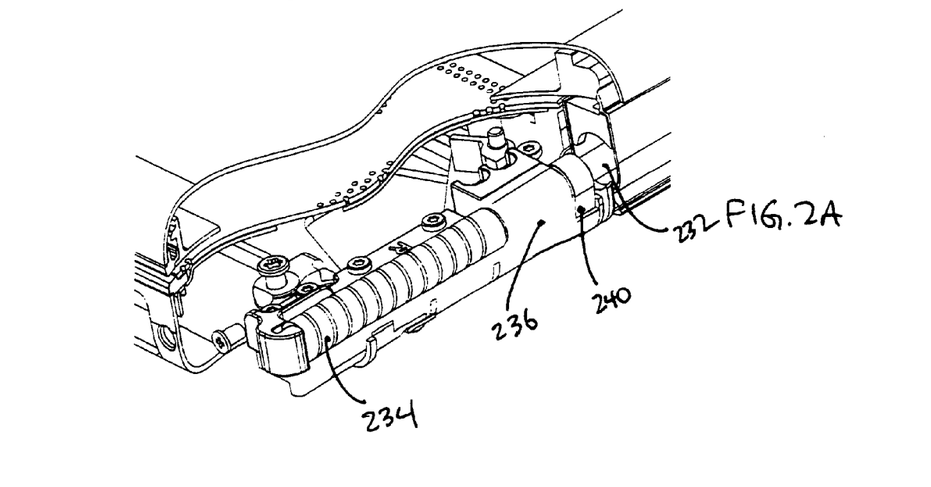
FIG. 2A illustrates an enlarged view of the hinge assembly of FIG. 2.

FIG. 2A illustrates an enlarged view of hinge assembly 230 that includes elongated shaft 232, spring 234, casting 236, and clutch foot limit stop 240. As described in greater detail below, in one embodiment of the present invention, spring 234 may be a counterbalance spring to offset the weight of display assembly 220 during rotational movement. Casting 236 includes a frictional element disposed therein, such as a friction clutch mechanism, to maintain display assembly 220 in a desired position. Clutch foot limit stop 240 is disposed adjacent to casting 236. In one embodiment, clutch foot limit stop 240 may also be referred to as a pop-up arm, and the terms are used interchangeably herein. Pop-up arm 240 creates a certain amount of opening force that must be overcome to close display assembly 210 over base assembly 220 completely, as illustrated in FIG. 2. The opening force existing when the display assembly 210 is in the closed position further provides a "pop-up" feature such that when a latch holding display assembly 210 is closed against over base assembly 220 is released, display assembly 210 angularly deflects or pops-up a distance sufficient to assist the user in grasping the display.

Figure 3:
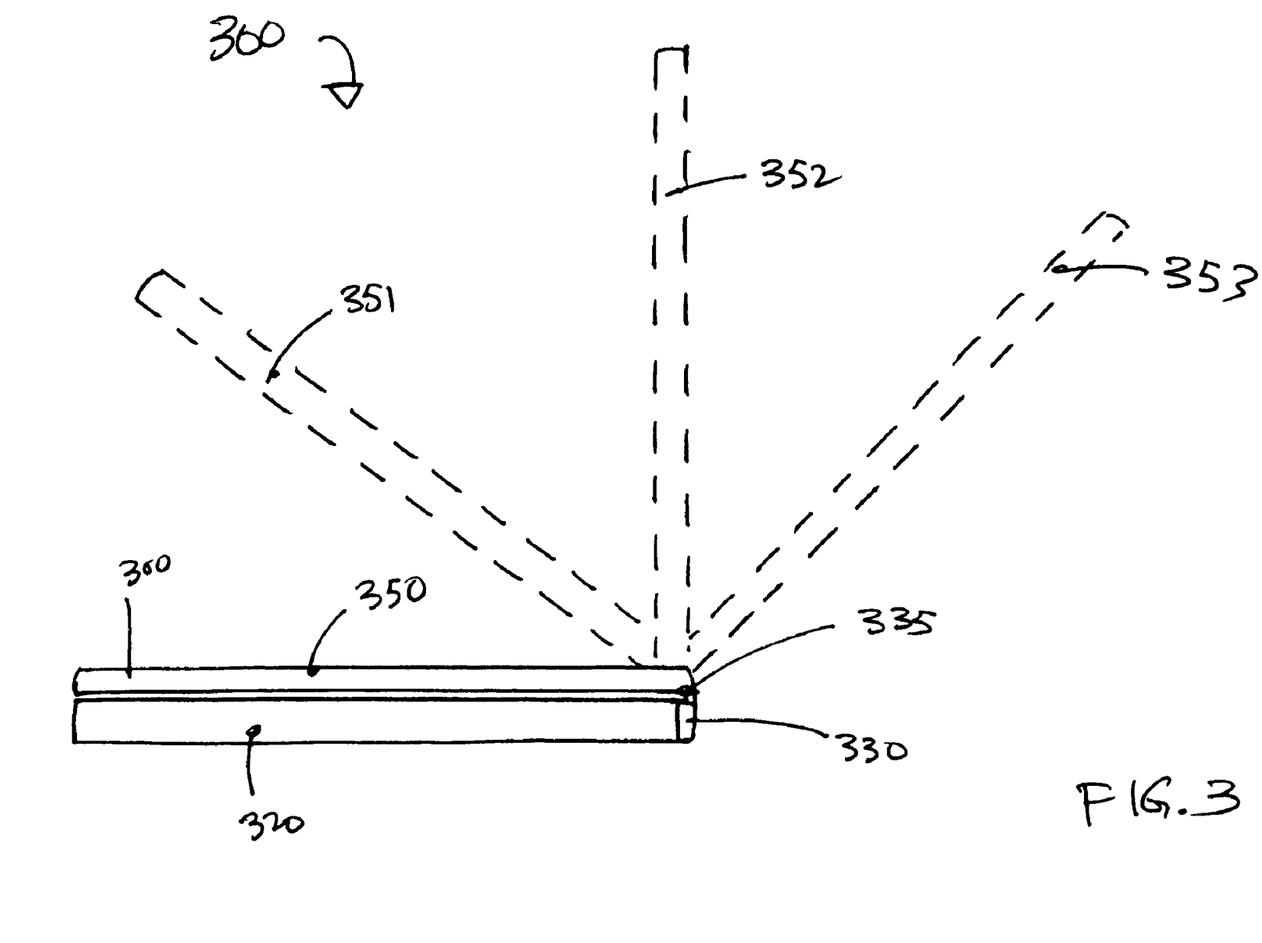
FIG. 3 illustrates a schematic view of one embodiment of the rotation of a display assembly relative to a base assembly.

FIG. 3 illustrates a side view of one embodiment of a portable computer 300 with display assembly 310 rotating relative to base assembly 320 about hinge assembly 330. The various rotational positions include closed position 350, first open position 351, second open position, 352, and third open position 353. From closed position 350, display assembly 310 may be rotated open relative to base assembly 320 to any number positions including the open positions shown and up to 180 degrees. The weight of the display assembly 310 creates at hinge assembly 330 a gravitational load or torque about pivot axis 335. The gravitational load is applied in a direction perpendicular to a plane passing through pivot axis 335 and the point at which load of display assembly 310 is applied.

Generally, a torque generated by a force is equal to the magnitude of the force multiplied by the straight line distance between the point where the force is applied and the pivot axis. If a force is applied directly along and toward the pivot axis, then no torque is applied. An example of a torque created when a force is applied to an object is a wrench used to turn a bolt. A torque has both a magnitude and a direction. In the case of the display assembly 310 coupled to the base assembly 320, as shown in FIG. 3, the pivot axis 355 passes through and along the centerline of a pivot shaft (e.g., shaft 232 of FIG. 2A). The force generating the torque is the weight of display assembly 310.

Accordingly, when the display assembly 310 is in the second open position 352, there is no torque applied by the weight of display assembly 310 about the pivot axis 355. When the display assembly 310 is in second open position 352, the weight of the display is acting in a direction parallel to the plane passing through pivot axis 335 and therefore there is no torque created about pivot axis 355. In first open position 351, display assembly 310 is rotated open approximately 45 degrees relative to base assembly 320. The weight of the display assembly 310 creates a counter-clockwise torque about pivot axis 355. This torque may also be referred to as a "closing torque" or "closing force" because it tends to cause display assembly 310 to close relative to base assembly 320. In the third open position 353, display assembly 310 is rotated open approximately 135 degrees relative to base assembly 320. The weight of the display assembly 310 creates a clockwise torque about pivot axis 355. This torque may also be referred to as an "opening torque" or "opening force" because it tends to cause display assembly 310 to rotate open relative to base assembly 320. Therefore, for any rotational displacement of the display assembly 310 relative to the base assembly 320, there may be a torque applied to pivot axis 355 by the weight of display assembly 310. This torque varies non-linearly with the angular position of display assembly 310.

Figure 4A:
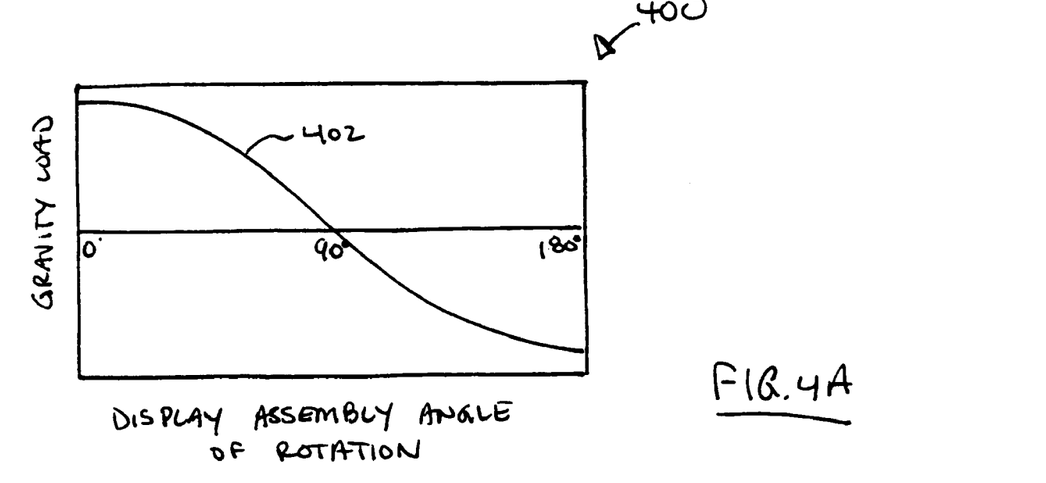
FIG. 4A is a moment graph of gravity load vs. angular position of the display assembly relative to the base assembly in one embodiment of the present invention.
Figure 4B:
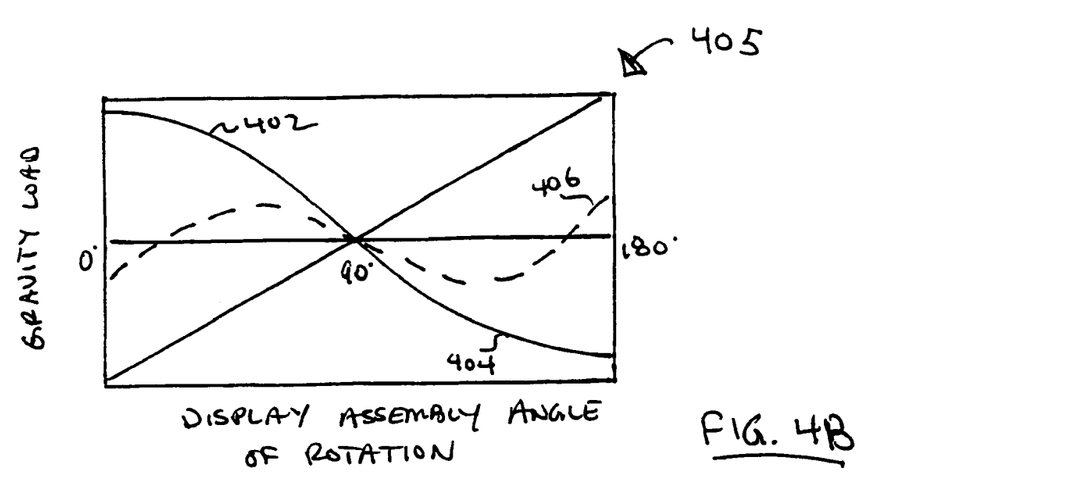
FIG. 4B is another moment graph of gravity load vs. angular position of the display assembly relative to the base assembly in one embodiment of the present invention.

FIGS. 4A–4D are moment graphs showing the magnitude and direction of the gravity load relative to the angular position of the display assembly (e.g., 310) relative to base assembly (e.g., 320) from 0 to 180 degrees. Graph 400 of FIG. 4A shows that, absent a counterbalance spring, for angular displacements of display assembly 310 relative to base assembly 320 between 0 and 90 degrees, the gravity load 402 is positive. For an angular position of 90 degrees, the gravity load 402 is zero, and for angular displacements greater than 90 degrees, the gravity load 402 is negative.

As described in greater detail below, with the presence of a counterbalance spring (e.g., spring 234 disposed within hinge assembly 330), as display assembly 310 is rotated open relative to base assembly 320, one end of the counterbalance spring is rotated relative to a second end. This rotation generates a rotational force upon the counterbalance spring. In response to this force, the counterbalance spring generates a rotational force in the opposite direction substantially equal to the angular displacement of counterbalance spring multiplied by the spring constant of the counterbalance spring. This force may be referred to as the counterbalance torque or force. In one embodiment of the present invention, the counterbalance torque varies in proportion to the rotational displacement of display assembly 310 relative to base assembly 320.

When more than one force or torque acts upon a single axis, the forces may be added to one another to determine the resultant or net force applied to the pivot axis. As shown in graph 405 of FIG. 4B, the counterbalance spring, in one embodiment of the present invention, provides a torque or load 404 which, when combined with the load 402 generated by the weight of display assembly 310, results in a combined load 406 that is approximately zero. When the forces exerted by display assembly 310 and the counterbalance spring are nearly equal, the display assembly 310 enters a state of near equilibrium, requiring only a slight force adjust the display assembly 310.

Figure 4C:
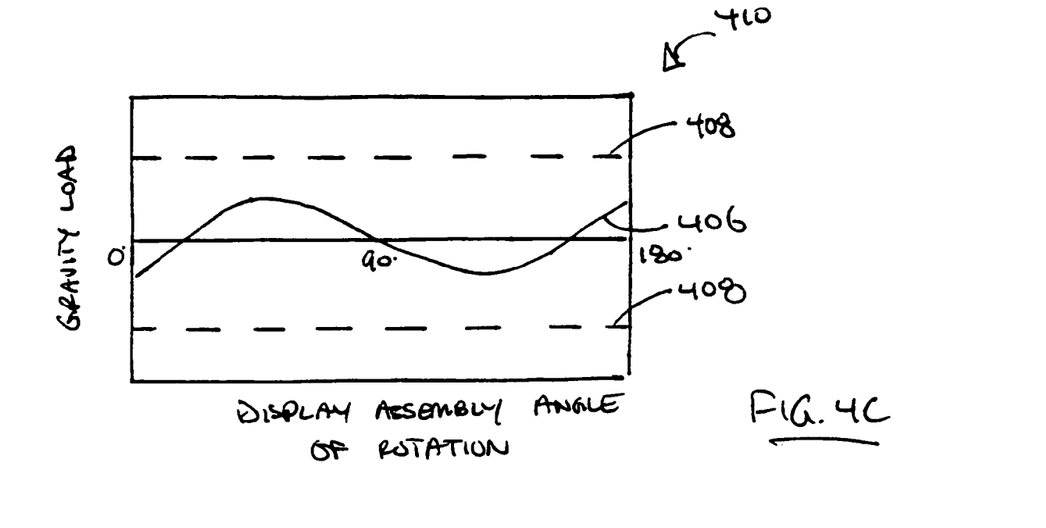
FIG. 4C is another moment graph of gravity load vs. angular position of the display assembly relative to the base assembly in one embodiment of the present invention.
Figure 4D:
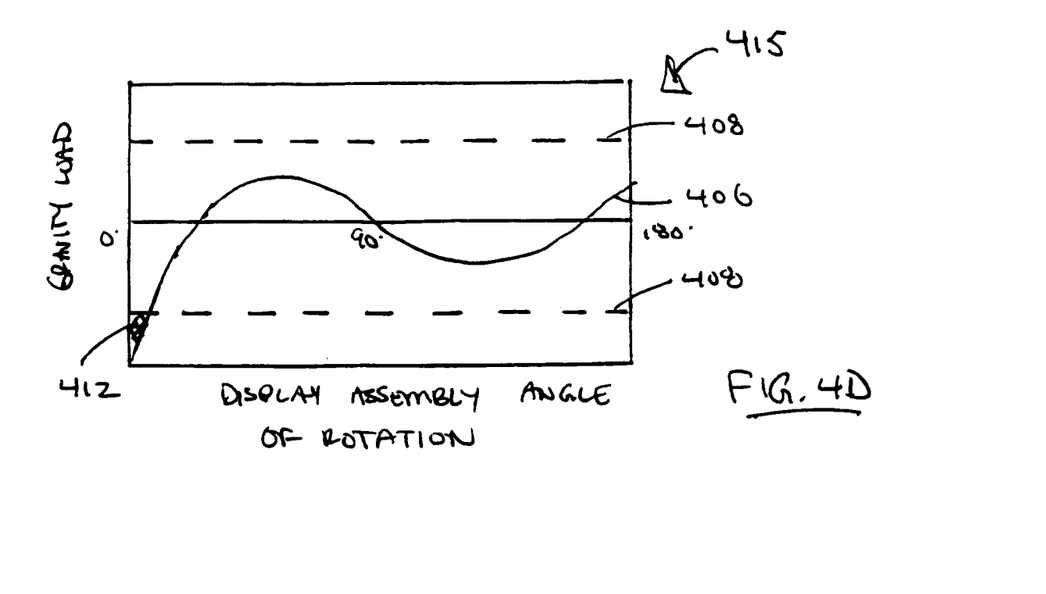
FIG. 4D is another moment graph of gravity load vs. angular position of the display assembly relative to the base assembly in one embodiment of the present invention.

Graph 410 of FIG. 4C illustrates that the state of near equilibrium from combined load 406 is maintained between friction forces 408 (created by a friction assembly within the hinge assembly, for example, 230, 330). Friction forces 408 allow the display assembly 310 to remain in the angular position desired by the user and must be overcome to change the angular position of the display assembly. In one embodiment of the present invention, a pop-up feature (e.g., pop-up arm 240) may be integrated within the hinge assembly 330. The pop-up feature increases the amount of force required to close display assembly 310 fully. In other words, as display assembly 310 nears base assembly 320, a user must exert an additional closing torque or load 412 (as shown in graph 415 of FIG. 4D) on the pivot axis 335 to overcome an opening force 412. The opening force 412 (which is greater than frictional forces 408) existing when the display assembly 310 is in the closed position further provides a "pop-up" feature such that when a latch holding the display assembly 310 closed against the base assembly 320 is released, the display assembly 310 angularly deflects or pops-up a distance sufficient to assist the user in grasping the display. In one embodiment, the pop-up feature may be part of a mechanism that is independent of the counterbalance weight provided by a counterbalance spring.

Figure 5:
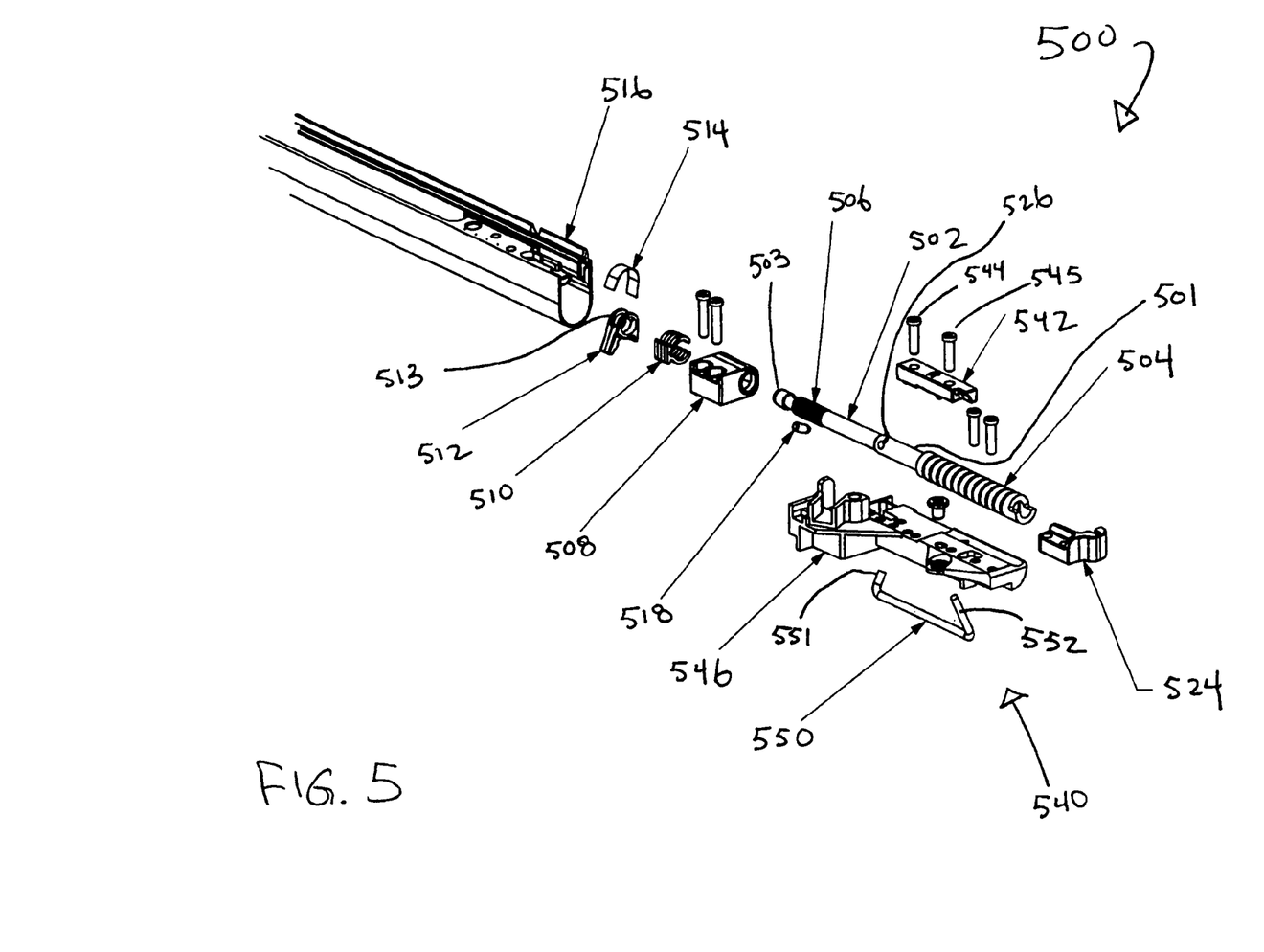
FIG. 5 illustrates an exploded view of a hinge assembly in one embodiment of the present invention.

FIG. 5 illustrates an exploded view of a hinge assembly 500 in one embodiment of the present invention. By way of example, hinge assembly 500 may be similar to hinge assembly 230 described above with respect to portable computer 200 of FIG. 2A. Hinge assembly 500 includes elongated shaft 502 having a shaft bearing surface with a first end 501 coupled to counterbalance spring 504. In one embodiment, counterbalance spring 504 may be a coiled torsion spring. A spring end cap 524 is coupled to an end portion of counterbalance spring 504. Spring end cap 524 conceals and protects counterbalance spring 504 in the fully assembly state. A second end 503 of shaft 502 has a grooved or splined portion 506 that is received by and is compatible within clutch barrel 516. Clutch barrel 516 is an outer housing, in one embodiment, that separates hinge assemblies disposed on either side of a notebook computer (e.g., hinge assemblies 230, 231). A friction housing 508 is disposed over shaft bearing portion 502. In one embodiment, friction housing 508 may be a clutch friction housing with one or more friction clips 510 that engages shaft bearing portion 502 to hold a display assembly (e.g., display assembly 210) in a static position. In alternative embodiments, other frictional mechanisms may be used.

Shaft 502 also includes a cross bore 526 that receives a strike pin 518 that extends out through an opening 513 of pop-up arm 512. Pop-up arm 512 is disposed on an opposite side of friction housing 508 relative to counterbalancing spring 504. Opening 513 of pop-up arm 512 guides a rotational movement of strike pin 518 coupled to shaft 502 near cross bore 526. As described in greater detail below, the rotation of strike pin 518 actuates the pop-up arm functionality, and is a feature independent of the counterbalance feature provided by counterbalance spring 504. A clip or limit stop label 514 covers pop-up arm 512. A thermal casting 540 that includes a lower casting 546 is disposed below shaft 502, and an end torsion bar 542 is disposed above shaft 502. One or more screws (e.g., screws 544, 545) may be used to couple end torsion bar 542 to thermal casting 540. A torsion bar clutch 550 is also disposed near lower casting 546 of thermal casting 540. Torsion bar clutch 550 has a first end 551 and a second end 552 that are substantially perpendicular to an elongated central portion and are also angularly deflected in opposite directions relative to each other. In one embodiment of the present invention, a first end 551 of torsion bar clutch 550 engages pop-up arm 512 and a second end 552 of torsion bar clutch 550 engages end torsion bar. As such, torsion bar clutch 550, in one embodiment, serves as a spring to allow for the actuation of pop-up arm 512.

In one embodiment of the present invention, as a display assembly is rotated open relative to a base assembly (e.g., display assembly 210 and base assembly 220 above), counterbalance spring 504 (e.g., a coiled torsion spring) rotates in a direction with the rotation of the display assembly. This rotation generates a rotational force upon counterbalance spring 504. In response to this force, counterbalance spring 504 generates a rotational force in a direction opposite and substantially equal to the angular displacement of counterbalance spring 504. As such, counterbalance spring 504, provides a torque which, when combined with the torque generated by the weight of a display assembly that are nearly equal, results in a combined torque that is approximately zero. In this state, a display assembly requires only a slight force for adjustment (discussed above with respect to FIGS. 3–4); that is, a force to overcome the frictional force of frictional clips 510 in contact with shaft bearing surface 502.

Shaft 502 passes through pop-up arm 512 that is disposed adjacent to friction clutch housing 508. The rotation of pop-up arm 512 in the path limited by strike pin 518 through opening 513 generates an opening torque or pop-up feature for a portable computer. The pop-up feature increases the amount of force required to close a display assembly fully. The opening force created by pop-up arm 512 when a display assembly is in the closed position provides the "pop-up" feature such that when a latch holding the display assembly closed against the base assembly is released, the display assembly angularly deflects or pops-up a distance sufficient to assist the user in grasping the display. In one embodiment of the present invention, the distance or travel generated by pop-up arm 512 may be up to 10 mm.

In one embodiment of the present invention, a portable computer pop-up feature is integrated within hinge assembly 500 that is independent of counterbalance spring 504. In prior art laptop hinge assemblies, the pop-up feature is integrated into the spring assembly by utilizing a spring with a particular spring constant to create an initial opening torque when a latch holding a display assembly closed is released. However, support structures such as display and base housing portions that may be entirely or partially metal-based may not be able to tolerate the torque from a pop-up feature integrated into a spring. For example, unlike display housing or base assembly housings made of plastic, metal-based housings may warp over time. It may be preferred that the housing material be primarily made of metal in order to provide greater durability and protection for a portable computer assembly. For example, the outer frame of the display assembly may be primarily made of a metal such as aluminum.

Figure 6:
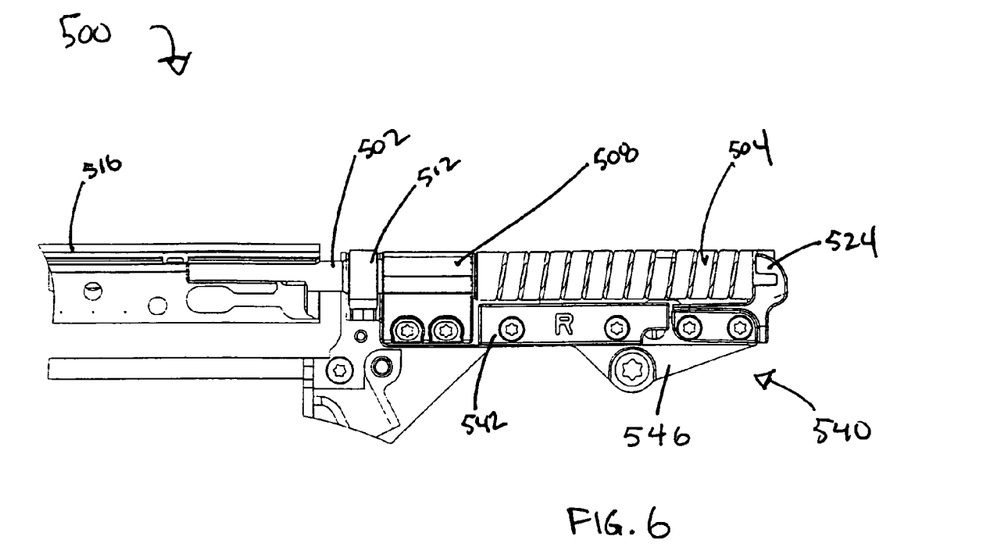
FIG. 6 illustrates an enlarged top view of a hinge assembly in one embodiment of the present invention.
Figure 6A:
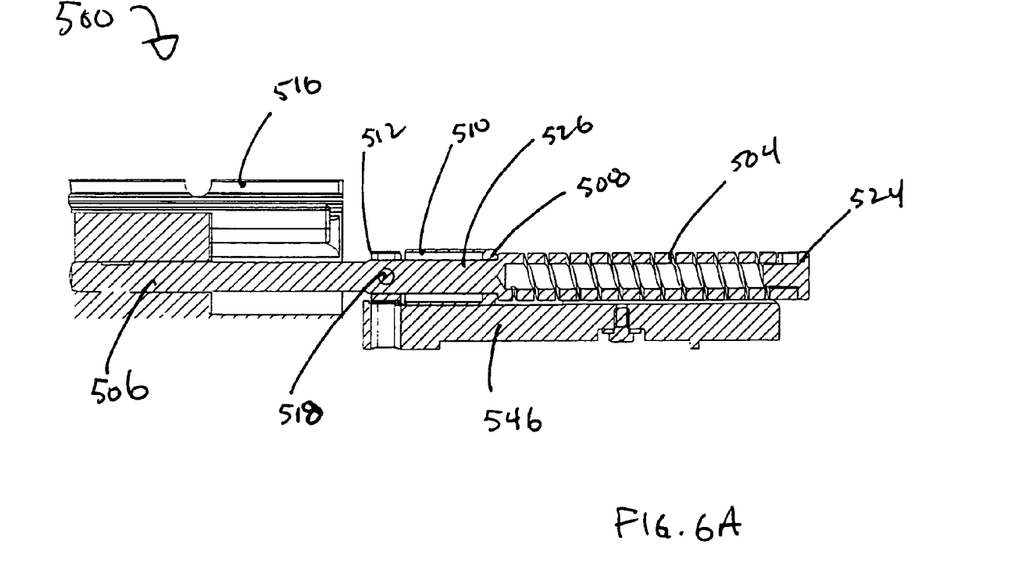
FIG. 6A illustrates a cross-sectional view of the hinge assembly of FIG. 6.

FIGS. 6 and 6A illustrate a top perspective view and the corresponding cross-sectional view, respectively, of hinge assembly 500 with its various elements in an assembled form. Elongated shaft 502 has an end portion that is coupled to counterbalance spring 504. End torsion bar 542 is screwed down to lower casting 546 of thermal casting 540. In one embodiment of the present invention, lower casting 546 and end torsion bar 542 may be coupled to a base assembly of a portable computer system. Friction housing 508 is disposed adjacent to counterbalance spring 504, and as discussed above, includes one or more friction clips 510 that engage cross bore 526 of shaft 502. Pop-up arm 512 is disposed adjacent to friction housing 508 and rotates around shaft 502 guided by strike pin 518. Clutch barrel 516 extends near pop-up arm 512 and is also coupled to the display assembly (not shown).

Figure 7:
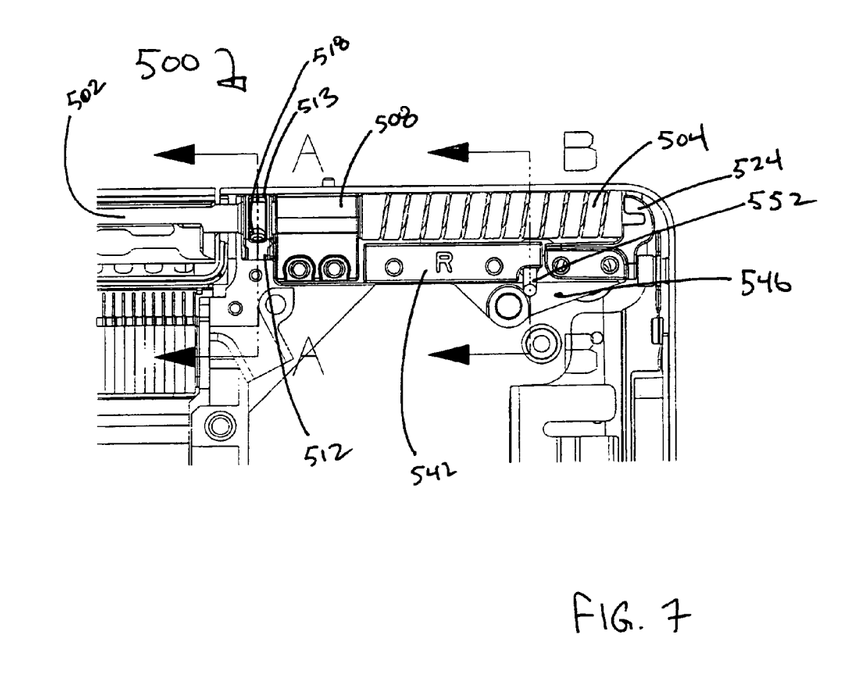
FIG. 7 illustrates another enlarged top view of a hinge assembly in one embodiment of the present invention.
Figure 7A:
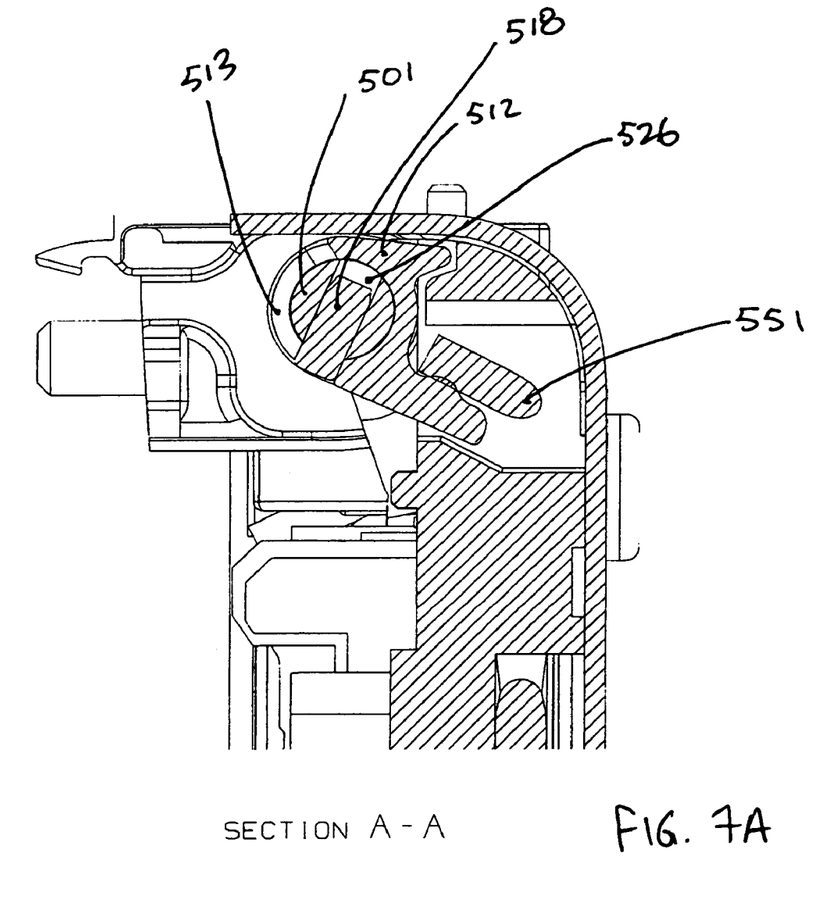
FIG. 7A illustrates a cross-sectional view of the hinge assembly of FIG. 7.
Figure 7B:
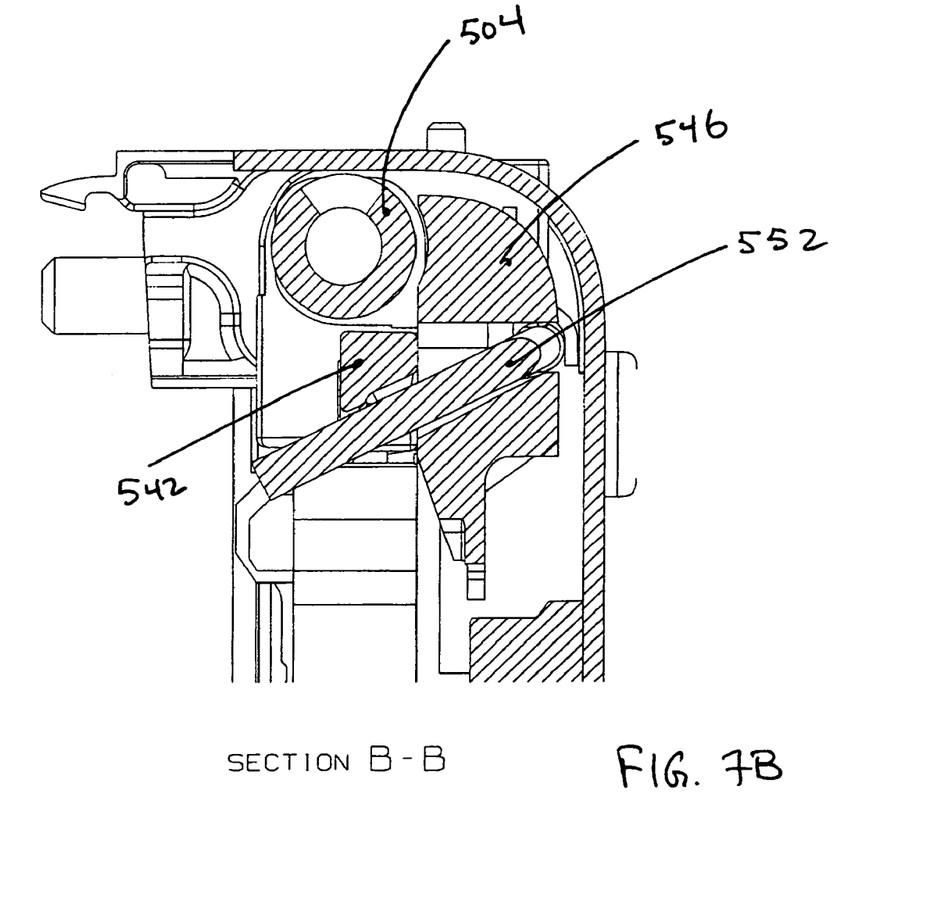
FIG. 7B illustrates another cross-sectional view of the hinge assembly of FIG. 7.

FIG. 7 illustrates another view of hinge assembly 500 with strike pin 518 exposed through opening 513 of pop-up arm 512. Strike pin 518, coupled to shaft 502 through a cross bore (e.g., cross bore 526), rotates shaft 502 to provide an independent pop-up feature relative to counterbalance spring 504. Second end 552 of torsion bar clutch 550 extends in a direction away from counterbalance spring 504 and also engages end torsion bar 542. FIGS. 7A and 7B illustrate cross-sectional views through sections A—A and B—B, respectively, of hinge assembly 500 to illustrate the pop-up mechanism more clearly. Section A—A is taken through pop-up arm 512 (and first end 551 of torsion bar clutch 550) and section B—B is taken through counterbalance spring 504 (and second end 552 of torsion bar clutch 550). When a display assembly is closed over a base assembly (e.g., display assembly 210 is closed over base assembly 220), tension is created in torsion bar clutch 550 by applying a force on second end 552 with lower casting 546 of thermal casting 540. A resistive force is applied to first end 551 with pop-up arm 512. When a tension on torsion bar clutch 550 is released (e.g., by releasing a latch that holds down the display assembly of the base assembly), first end 551 rotates pop-up arm 512. The rotation of pop-up arm 512 engages strike pin 518, which in turn rotates end 501 of shaft 502. As such, the rotation of pop-up arm 512 in contact with strike pin 518 is the actuation that provides the pop-up feature.

Figures 8A, 8B:
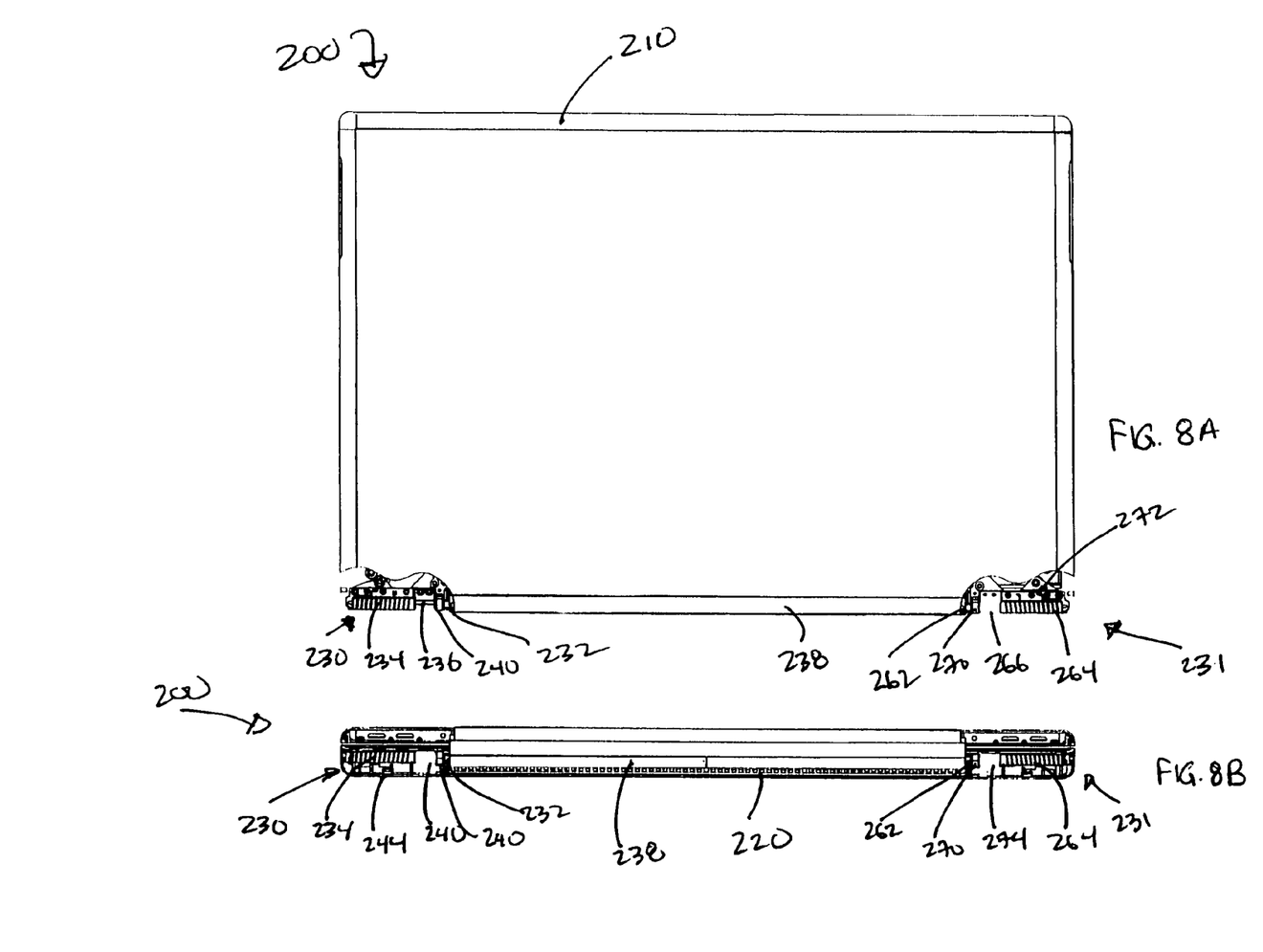
FIG. 8A illustrates a partial see-through view of one embodiment of a portable computer having a display assembly, base assembly, and a hinge assembly in an open position.
FIG. 8B illustrates a partial see-through view of one embodiment of a portable computer having a display assembly, base assembly, and a hinge assembly in a closed position.

FIGS. 8A and 8B illustrate open and closed views, respectively, of portable computer 200 having display assembly 210 coupled to base assembly 220 with partial cut-out views of hinge assemblies 230, 231. Hinge assembly 230 is disposed near one end of base assembly 220 and hinge assembly 231 is disposed near an opposite end. In one embodiment, display assembly 210 and base assembly 220 may be primarily metal-based. For example, a display housing or display frame surrounding a display may be made of aluminum, titanium, or other metals/mixtures. Alternatively, all or parts of the base assembly such as the palm rest or bottom surface may be made of aluminum, titanium, or other metals/mixtures. End torsion bars 242, 272 are coupled to an inside of display assembly 210, namely, a housing portion. Elongated shaft portions 232, 262 extend into a center portion of the back side of portable computer 200 that is partially covered by clutch barrel 516. Counterbalancing springs 234, 264 are disposed friction housings 236, 266, as well as pop-up arms 240, 270. The open position of FIG. 8A shows friction housings 236, 266 rotated around shafts 232, 262. As discussed above, clip-style friction clutches disposed within friction housings 236, 266 maintain display assembly 210 in the open position. The closed position of FIG. 8B shows lower portions 244, 274 of the thermal castings coupled to base assembly 220. In the closed position, pop-up arms 240, 270 generate an opening torque that slightly opens display assembly 210 from a side opposite shown. The small amount of display travel generated by the pop-up feature allows a user to grasp display assembly 210 and rotate it open easily because of the counterbalancing effects of counterbalancing springs 234, 264.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A hinge assembly, comprising:
   a shaft;
   a counterbalance spring coupled to said shaft;
   a friction element disposed on said shaft; and
   a pop-up element having a torsion bar clutch disposed adjacent to said shaft, wherein said counterbalance spring, said friction element, and said pop-up element having a torsion bar clutch are associated with independent mechanisms of said hinge assembly and wherein said pop-up element comprises a pop-up arm disposed around said shaft and wherein a strike pin coupled to said shaft limits a movement of said pop-up arm.

2. The hinge assembly of claim 1, wherein said counterbalance spring supports a weight of a display assembly relative to a base assembly of a portable computer.

3. The hinge assembly of claim 2, wherein said friction element comprises an clip-style friction clutch.

4. The hinge assembly of claim 3, wherein said clip-style friction clutch maintains said display assembly in a static position relative to said base assembly.

5. The hinge assembly of claim 2, wherein said pop-up element stores an opening force to create a certain amount of initial travel for said display assembly relative to said base assembly.

6. The hinge assembly of claim 1, wherein said counterbalance spring comprises a coiled torsion spring.

7. A portable computer, comprising:
 a display assembly having a display screen and a display housing;
 a base assembly;
 a counterbalance hinge assembly that couples said display assembly to said base assembly; and
 a pop-up feature having a torsion bar clutch disposed near said counterbalance hinge assembly, wherein said pop-up feature is part of a mechanism that is independent of said counterbalance hinge assembly, said counterbalance hinge assembly comprises a friction clutch and a coiled torsion spring coupled to an elongated shaft and said pop-up feature comprises a pop-up arm disposed around said elongated shaft, and wherein a strike pin coupled to said elongated shaft limits a movement of said pop-up arm.

8. The portable computer of claim 7, wherein said display housing comprises metal.

9. The portable computer of claim 8, wherein said display housing comprises aluminum.

10. The portable computer of claim 8, wherein said display housing is titanium.

11. The portable computer of claim 8, wherein said display housing comprises steel.

12. The portable computer of claim 7, wherein said counterbalance hinge assembly comprises a bracket assembly having a top bracket coupled to said display assembly and a bottom bracket coupled to said base assembly.

13. The portable computer of claim 7, wherein said counterbalance hinge assembly allows said display assembly to rotate relative to said base assembly up to 180 degrees.

14. A portable computer, comprising:
 a display assembly having a display screen and a display housing;
 a base assembly; and
 at least two independent hinge assemblies comprising a first and a second hinge assemblies, each having at least three independent mechanisms comprising torsional and frictional elements, including a counterspring assembly, a pop-up element having a torsion bar clutch, and a friction element, that couples said display assembly to said base assembly,
 wherein said first and second hinge assemblies comprise a counterbalance spring coupled to an elongated shaft to support a weight of said display assembly, a pop-up feature disposed near said first and second hinge assemblies, said pop-up feature comprises a pop-up arm disposed around said elongated shaft and wherein a strike pin coupled to said elongated shaft limits a movement of said pop-up arm.

15. The portable computer of claim 14, wherein said pop-up feature is independent of said counterbalance hinge assembly.

16. The portable computer of claim 14, wherein said hinge assemblies include a friction clutch to maintain said display assembly in a static position.

17. The portable computer of claim 14, wherein said counterbalance spring comprises coiled torsion spring.

18. The portable computer of claim 14, wherein said first and second hinge assemblies comprise a bracket assembly having a top bracket coupled to said display assembly and a bottom bracket coupled to said base assembly.

19. The portable computer of claim 14, wherein said display housing is aluminum.

20. The portable computer of claim 14, wherein said display housing comprises titanium.

21. The portable computer of claim 14, wherein said display housing comprises steel.

* * * * *